United States Patent [19]

Seiderman

[11] Patent Number: 4,488,410
[45] Date of Patent: Dec. 18, 1984

[54] CONTROL APPARATUS FOR AUTOMOTIVE AIR CONDITIONER

[76] Inventor: Abe Seiderman, 7365 SW. 132nd St., Miami, Fla. 33156

[21] Appl. No.: 302,771

[22] Filed: Sep. 16, 1981

Related U.S. Application Data

[62] Division of Ser. No. 169,994, Jul. 18, 1980, abandoned.

[51] Int. Cl.³ .......................... B60H 3/04; F25B 27/00
[52] U.S. Cl. ........................................ 62/133; 62/158; 62/243; 62/323.4
[58] Field of Search ...................... 62/323.4, 239, 243, 62/244, 133, 215, 226, 230, 158

[56] References Cited

U.S. PATENT DOCUMENTS

| | | | |
|---|---|---|---|
| 3,485,059 | 12/1969 | Hawks | 62/230 |
| 4,142,375 | 3/1979 | Abe et al. | 62/158 |
| 4,206,613 | 6/1980 | Shockley | 62/133 |
| 4,275,688 | 6/1981 | Abe et al. | 62/133 |

Primary Examiner—Harry B. Tanner
Attorney, Agent, or Firm—Oltman and Flynn

[57] ABSTRACT

On an automotive vehicle having a stick-shift transmission and an air conditioner, the air conditioner is turned off by a switch operated by the gear shift lever when shifting from neutral into first gear. The air conditioner is kept off during the relatively brief interval while the transmission is being shifted through the lower gears. The air conditioner comes on after the transmission has been shifted into high gear.

7 Claims, 10 Drawing Figures

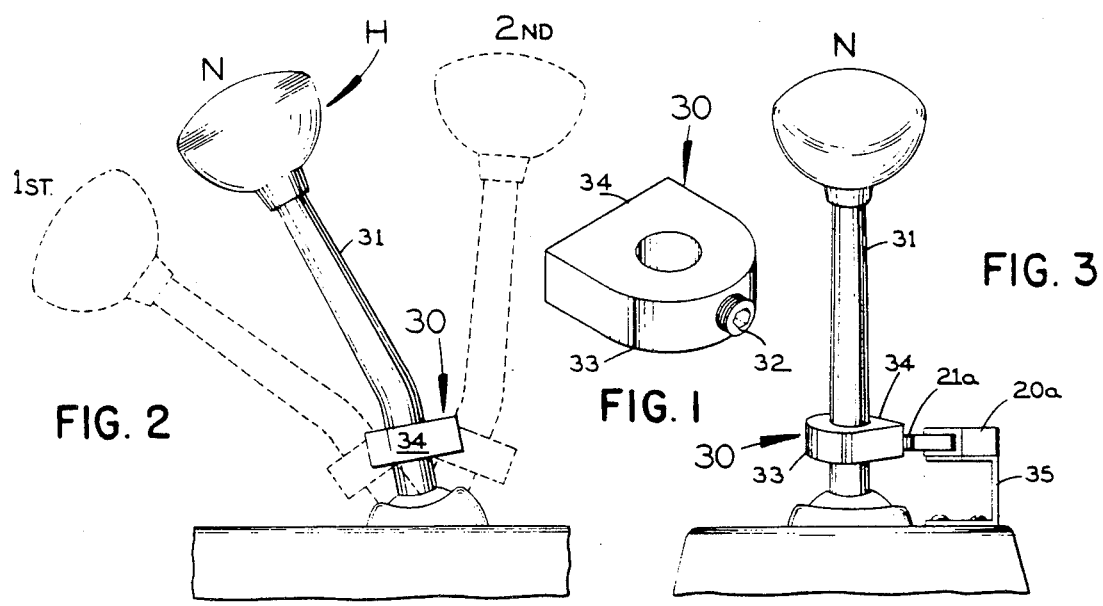
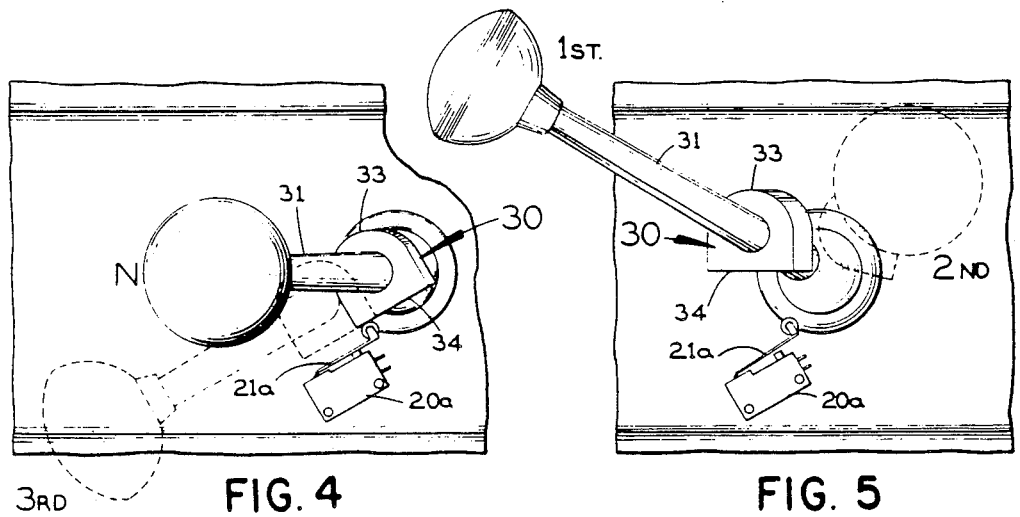

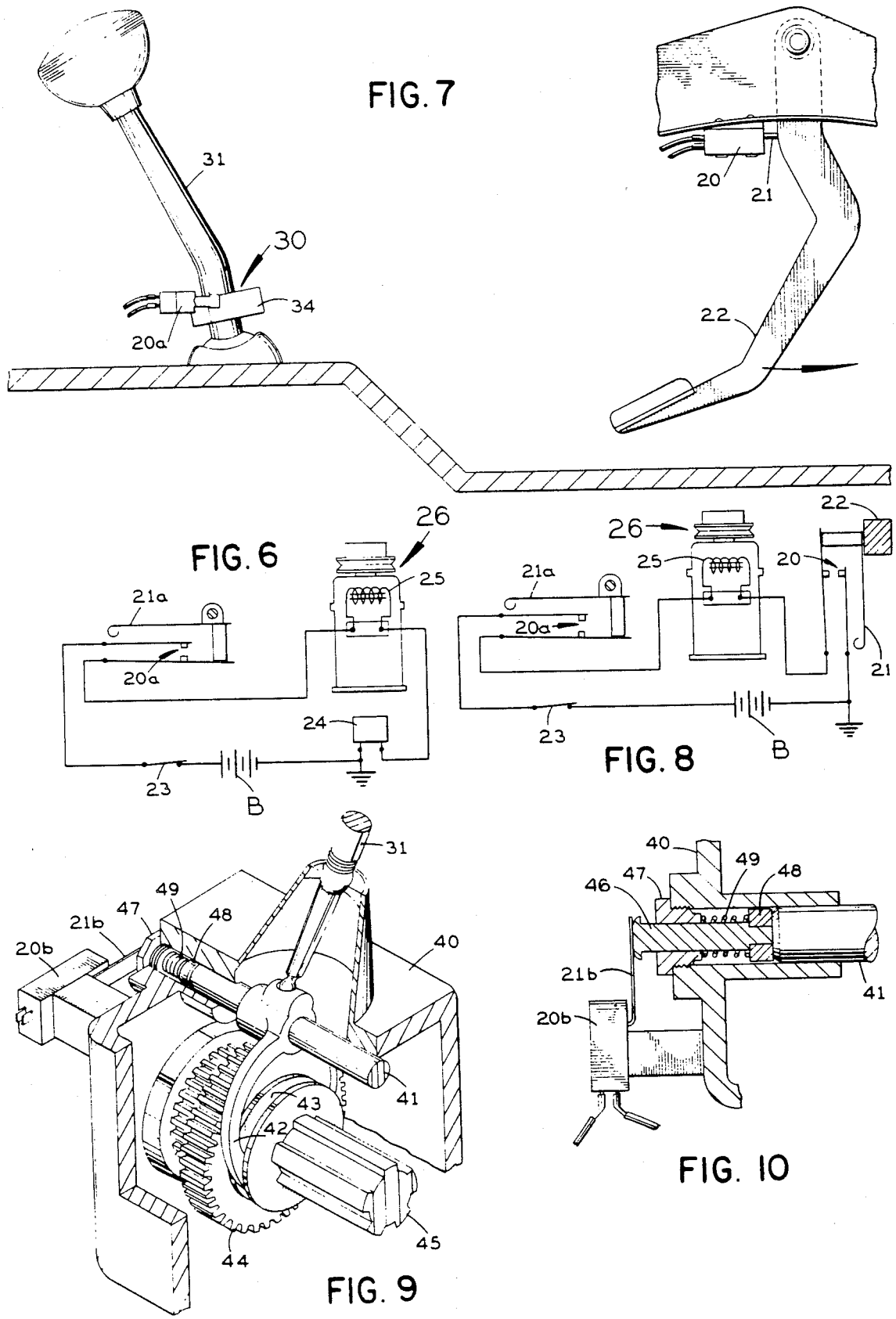

CONTROL APPARATUS FOR AUTOMOTIVE AIR CONDITIONER

CROSS-REFERENCE TO RELATED APPLICATION

This application is a division of my copending U.S. patent application, Ser. No. 06/169,994, filed July 18, 1980, abandoned.

SUMMARY OF THE INVENTION

This invention relates to an apparatus for turning off the air conditioner in an automotive vehicle with a stick shift transmission while the transmission is being shifted through the low gears.

Various arrangements have been proposed heretofore which operate off the vehicle engine intake manifold to turn off the air conditioner while the vehicle is accelerating. U.S. Pat. No. 3,918,543 to Halem discloses such an arrangement.

The present invention is directed to a novel apparatus in which the air conditioner is on when the transmission is in neutral, such as when the vehicle is paused at a stop light, and when the transmission is in high gear. The air conditioner is turned off while the transmission is being shifted from neutral through the lower gears and into high gear, thereby reducing the load on the engine while the vehicle is accelerating. A substantial amount of fuel is saved. The present invention avoids undue frequent acceleration of the air conditioner compressor since the compressor will be on only while the engine is idling in neutral or the engine has settled down into a relatively low RPM in high gear. The interior cooling of the vehicle is not seriously affected by turning off the air conditioner during the usually brief interval required to shift through the lower gears. Several embodiments of the invention are disclosed which are adapted for relatively simple attachment to a vehicle having a gear shift lever-operated transmission, whether three speed, four speed or five speed, and having any shifting pattern.

A principal object of this invention is to provide a novel and improved apparatus for turning off the air conditioner in an automotive vehicle while the vehicle transmission is being shifted manually through the lower gears.

Another object of this invention is to provide such an apparatus in which the air conditioner is turned off in response to the shifting of the gear shift lever out of neutral into first gear and is kept off until the transmission is in high gear.

Further objects of this invention will be apparent from the following detailed description of three presently preferred embodiments thereof, which are shown in the accompanying drawings.

DESCRIPTION OF THE DRAWINGS

FIG. 1 is a perspective view of a switch-operating ring for attachment to the gear shift lever on a car in two embodiments of the present invention;

FIG. 2 is an elevation showing this ring in place on the gear shift lever, which is shown in full lines in the neutral position and is shown in phantom in the first and second gear positions;

FIG. 3 is an elevation taken from the left end of FIG. 2 and showing the switch which is operated by the ring on the gear shift lever;

FIG. 4 is a top plan view of the apparatus shown in FIG. 3, showing the gear shift lever in full lines in its neutral position and in phantom in its third gear position;

FIG. 5 is a top plan view showing the gear shift lever in full lines in its first gear position and in phantom in its second gear position;

FIG. 6 is a schematic electrical circuit diagram of a first embodiment of the invention in which the gear shift lever-operated switch of FIGS. 3-5 and a timer jointly control the air conditioner;

FIG. 7 is an elevational view showing a second embodiment of the invention in which the gear shift lever-operated switch of FIGS. 3-5 and a clutch pedal-operated switch jointly control the operation of the air conditioner;

FIG. 8 is a schematic electrical circuit diagram of this second embodiment;

FIG. 9 is a perspective view, with parts broken away for clarity, showing a third embodiment of the invention; and FIG. 10 is a vertical longitudinal section showing part of the apparatus which is shown more completely in FIG. 9.

DETAILED DESCRIPTION

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

FIGS. 1-6 illustrate a first embodiment of the invention in which the operation of the air conditioner on a car or other automotive vehicle is controlled by the position of the usual gear shift lever for the vehicle's transmission. The vehicle also has a clutch operated by a conventional clutch pedal which is depressed each time the transmission is shifted. As shown in FIG. 6, the operating coil 25 of an electromagnetic clutch 26 for the compressor of the air conditioner is connected across the vehicle battery B through an on/off or thermostatic switch 23, a switch 20a operated by the gear shift lever, and a timer 24 of known design.

The timer 24 includes a relay (not shown) having normally-closed contacts which open in response to the opening of switch 20a and remain open for a predetermined time interval, which may be set by a rotatably adjustably control knob. Typically, the control knob is set to establish a time delay of about six seconds between the opening of the gear shift lever operated switch 20a and the closing of the relay contacts in the timer.

The switch 20a is a normally-open snap-acting switch of known design having a cantilever mounted actuator 21a (FIGS. 4 and 5) which when pushed toward the switch closes its normally-open contacts. Switch 20a is supported by a rigid channel-shaped bracket 35 (FIG. 3) at one side of the usual gear shift lever 31 in the vehicle. The switch actuator 21a is positioned for engagement by a ring 30 affixed to the gear shift lever 31 by means of a set screw 32 (FIG. 1). This ring may be slid down onto the gear shift lever 31 after first removing the latter's handle H at the top. The ring 30 has a generally D-shaped periphery which is cylindrical on one side of the gear shift lever, as shown at 33, and flat on the opposite side, as shown at 34.

In the neutral position of the gear shift lever (shown in full lines in FIG. 4), the flat surface 34 on the ring 30 engages the switch actuator 21a and holds switch 20a closed. However, when the gear shift lever 31 is pivoted to the first gear position (shown in full lines in FIG. 5 and in phantom in FIG. 2), the ring 30 moves out of engagement with the switch actuator 21a, permitting switch 20a to assume its normal open condition. The switch remains open when the gear shift lever is in the second gear position (shown in phantom in FIGS. 2 and 5). When the gear shift lever 30 is in the third gear position (shown in phantom in FIG. 4), the flat surface 34 on the cam 30 again engages the switch actuator 21a to open the switch 20a.

With this arrangement, when the driver shifts the gear shift lever 31 out of neutral and into first gear, this opens switch 20a to de-energize the coil 25 of the clutch 26 for the air conditioner compressor. Therefore, the air conditioner is turned off within a fraction of a second after the gear shift lever is shifted into first gear. The timer 24 is turned on when switch 20a opens upon the displacement of the gear shift lever 31 from neutral into first gear. When the timer turns on, it opens a set of relay contacts which will remain open for a predetermined time interval, e.g., six seconds. Therefore, even when switch 20a is closed momentarily by ring 30 on the gear shift lever 31 as it moves through the neutral gate between the first and second gear positions, or between second and third, the air conditioner compressor will not come on, until two conditions are satisfied:

(1) the gear shift lever 31 is in third or a higher gear; and
(2) the timer's interval (e.g., six seconds) has elapsed since the gear shift lever was first moved out of neutral.

For a typical driver this six second interval will be long enough for him or her to complete the shifting of the gears from neutral through first and second gears and into third gear. Such a driver will have shifted into third gear to close the switch 20a by the time the relay contacts in the timer 24 close at the end of the six second interval to complete the energization circuit for coil 25, so that the compressor in the air conditioner can come back on.

FIGS. 7 and 8 show a second embodiment of the invention in which the gear shift lever-operated switch 20a of FIGS. 1-6 and a clutch pedal-operated switch 20 are connected in series with the operating coil 25 of the air conditioner compressor's clutch 26 across the vehicle battery B, along with the on/off or thermostatic switch 23 for the air conditioner.

Switch 20 is a normally-open snap-acting switch with a reciprocable actuator 21 which, when pushed in, closes the switch. The switch actuator is pushed in by the foot pedal 22 for the clutch of the vehicle in the normal position of the latter. When the clutch pedal 22 is depressed by the driver (pivoting counterclockwise in FIG. 7) to engage the clutch, it releases the switch actuator 21, permitting the switch 20 to assume its normal open condition.

As already described in detail with reference to FIGS. 1-6, the gear shift lever-operated switch 20a is open when the gear shift lever 31 is in first or second gear position, so that under these conditions the air conditioner is off. When shifting gears, each time the clutch pedal 22 is depressed it opens the switch 20 to insure that the compressor will not come on during the momentary passage of the gear shift lever through the neutral gate as it is moved from first to second gear or from second to third gear. Therefore, once the gear shift lever 31 is out of neutral and has not yet reached the third gear position, the air conditioner will be kept off.

In the embodiment of FIGS. 9 and 10, a switch 20b with normally-closed contacts and operated by a cantilevered actuator 21b is connected in series with the on/off or thermostatic switch 23 and the operating coil 25 of the clutch 26 of the air conditioner's compressor across the battery in the manner shown in FIG. 6, except that the timer now is omitted from the circuit. This switch 20b is held open by the actuator 21b and keeps the air conditioner off until the manual transmission is shifted into the normal driving gear, such as third, fourth or fifth gear, depending upon the type of car.

Inside the transmission casing 40 a longitudinally displaceable shift rail 41 carries the shifting fork 42 whose upper end is pivotally coupled to the lower end of the gear shift lever 31. The lower end of this fork is engageable in an undercut groove 43 on an integral axial extension of the gear 44. When the gear shift lever 31 is shifted into this gear (after having been shifted through the lower gears), the shift rail 41 is displaced axially to the right in FIG. 9, along with the gear 44 which is shifted to the right along the splined shaft 45.

As shown in FIG. 10, the switch actuator 21b is engaged by the outer end of a plunger 46, which is slidably received in a bushing 47 screw-threadedly mounted in the adjacent wall of the transmission casing. An annular head 48 is fastened to the inner end of the plunger 46 and engages the left end of the shift rail 41 in FIGS. 9 and 10. A coil spring 49 is engaged under compression between the bushing 47 and the head 48 to bias plunger 46 and shift rail 41 to the right in FIG. 10. This is the position of the parts until the gear 44 is shifted into driving engagement in the transmission, and in this position the switch 20b is held open by the actuator 21b.

With this arrangement, therefore, switch 20b remains open until gear 44 is shifted, at which time the displacement of the shift rail 41 to the right enables spring 48 to move plunger 46 to the right, releasing the switch actuator 21b so that switch 20b closes to energize the coil of the compressor clutch in the air conditioner.

I claim:

1. On an automotive vehicle having an engine, a transmission, a gear shift lever for shifting said transmission, a clutch pedal, and an air conditioner, the improvement which comprises:
control means operable in response to the actuation of said gear shift lever and independent of the acceleration of the vehicle for maintaining the air conditioner off while the transmission is being shifted through the lower gears and for turning on the air conditioner after the transmission is shifted into high gear.

2. The apparatus recited in claim 1, wherein said control means comprises:
a switch operable by said gear shift lever and a timer operatively connected to control jointly the operation of the air conditioner;
said switch being operable in response to the shifting of the gear shift lever into a lower gear position to turn off the air conditioner and start the timer to cycle through a predetermined time interval;
and said timer being operatively connected to the air conditioner to keep the air conditioner off throughout said time interval independent of said switch.

3. The apparatus recited in claim 2, wherein said control means comprises:
   means on said gear shift lever engaging said switch in the neutral position of said lever to actuate said switch for keeping the air conditioner on;
   said means on the gear shift lever disengaging from said switch to cause said switch to turn off the air conditioner when the gear shift lever is shifted from neutral into a lower gear position.

4. The apparatus of claim 3, wherein:
   said means on the gear shift lever engages said switch in a high gear position of the shift lever to actuate said switch for turning on the air conditioner at the completion of said time interval of the timer.

5. The apparatus recited in claim 2, wherein said control means also comprises:
   a ring detachably fastened to the gear shift lever and engageable with said switch in certain positions of the gear shift lever.

6. The apparatus of claim 5, wherein:
   said switch is normally-open;
   said ring engages said switch to maintain it closed in the neutral position of the gear shift lever;
   and said ring disengages from said switch and permits it to open when the gear shift lever is shifted from neutral into a lower gear position.

7. The apparatus of claim 6, wherein:
   said ring engages the switch to maintain it closed in the high gear position of the gear shift lever for turning the air conditioner on at the completion of said time interval of the timer.

* * * * *